(12) United States Patent
Bai et al.

(10) Patent No.: US 8,542,461 B2
(45) Date of Patent: Sep. 24, 2013

(54) WRITER SHIELDS WITH MODIFIED SHAPES FOR REDUCED FLUX SHUNTING

(75) Inventors: Zhigang Bai, Milpitas, CA (US); Moris Dovek, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 268 days.

(21) Appl. No.: 12/806,803

(22) Filed: Aug. 20, 2010

(65) Prior Publication Data

US 2012/0044598 A1 Feb. 23, 2012

(51) Int. Cl.
*G11B 5/147* (2006.01)
*G11B 5/187* (2006.01)

(52) U.S. Cl.
USPC .................................. 360/125.3; 360/125.15

(58) Field of Classification Search
USPC ............... 360/125.3, 125.03, 125.06, 125.08, 360/125.11, 125.12, 125.15
See application file for complete search history.

(56) References Cited

U.S. PATENT DOCUMENTS

| | | | |
|---|---|---|---|
| 7,518,825 B2 | 4/2009 | Nishida et al. | |
| 7,777,987 B2 | 8/2010 | Guan et al. | |
| 7,889,456 B2 * | 2/2011 | Jiang et al. | 360/125.08 |
| 7,920,358 B2 * | 4/2011 | Jiang et al. | 360/125.17 |
| 8,107,193 B2 * | 1/2012 | Nunokawa et al. | 360/125.08 |
| 8,233,235 B2 * | 7/2012 | Chen et al. | 360/125.15 |
| 8,277,669 B1 * | 10/2012 | Chen et al. | 216/22 |
| 8,300,359 B2 * | 10/2012 | Hirata et al. | 360/125.3 |
| 8,310,787 B1 * | 11/2012 | Sasaki et al. | 360/125.3 |
| 2005/0219752 A1 * | 10/2005 | Takahashi | 360/126 |
| 2008/0316653 A1 * | 12/2008 | Sasaki et al. | 360/319 |
| 2009/0059426 A1 * | 3/2009 | Sasaki et al. | 360/125.02 |
| 2009/0296275 A1 * | 12/2009 | Sasaki et al. | 360/125.3 |
| 2011/0134569 A1 * | 6/2011 | Allen et al. | 360/123.12 |
| 2011/0135962 A1 * | 6/2011 | Hong et al. | 428/815 |

* cited by examiner

*Primary Examiner* — Jefferson Evans
(74) *Attorney, Agent, or Firm* — Saile Ackerman LLC; Stephen B. Ackerman (57) ABSTRACT

A perpendicular magnetic recording (PMR) head is fabricated with a configuration of leading edge shields and trailing edge shields that reduce the leakage of flux between the main pole and the shields. The reduction of leakage is achieved by eliminating the sharp 90° corner between the backside surfaces of the shields and the surfaces adjacent to the main pole. In one embodiment the corner is replaced by two successive acute angles, in another embodiment it is replaced by a rounded surface. In a final embodiment, leakage between the pole and trailing edge shield is achieved by shortening the length of the write gap by forming the shield with a double taper.

29 Claims, 5 Drawing Sheets

WRITER SHIELDS WITH MODIFIED SHAPES FOR REDUCED FLUX SHUNTING

BACKGROUND OF THE INVENTION

1. Field of the Invention

This invention relates to the fabrication of a perpendicular magnetic recording (PMR) write head whose main pole is at least partially surrounded by shields formed of magnetic material. In particular it relates to such a head that is shielded at its trailing edge by a shield that is tapered in a plane perpendicular to the ABS (air bearing surface) plane.

2. Description of the Related Art

The increasing need for high recording area densities (up to 1 Tb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

Since their first use, the PMR head has evolved through several generations. Initially, the PMR head was a monopole, but that design was replaced by a shielded head design with a trailing edge shield (TS), which, due to its negative field, provides a high field gradient in the down-track direction to facilitate recording at high linear densities.

Side shields (SS) then began to be used in conjunction with the trailing edge shields, because it was necessary to eliminate the fringing side fields in order to increase writing density still further. Unfortunately, despite the benefits they provided, the presence of these shields inevitably reduce the field produced by the main pole because the basis of their operation is the removal of portions of the flux of that field. Therefore, as long as design functionalities can be achieved, it is important to reduce any additional flux shunting by the shields from the main pole. This is a particularly important consideration for future PMR writer designs which utilize increasingly small pole tips. In addition, in order to address the problem of wide area track erasure (WATE), it is desirable to increase the throat height of the trailing shield by making it thick. This additional thickness shunts additional flux away from the pole itself.

Several trailing edge shield designs have been proposed in the prior arts. These designs share a common feature, that the angle between the back-side face (face opposite the ABS) of the shield and the surface of the shield bordering the write gap, are orthogonal to each other (see FIG. 1 below). This 90° corner creates flux shunting when the write pole is activated due to the magnetostatic effect that causes flux to preferentially accumulate at sharp corners. This additional flux shunting has a disadvantageous effect on the writing ability of the pole.

Figure 1:
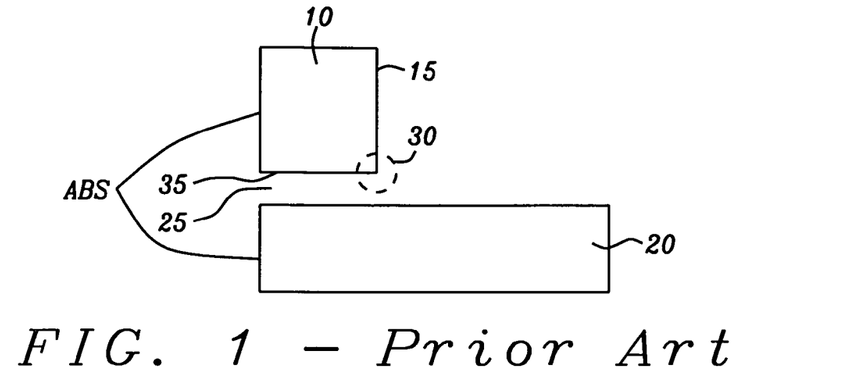
FIG. 1 is a schematic cross-sectional view, perpendicular to the ABS plane, of a prior art PMR writer having a main pole tip of uniform thickness adjacent to a prior art trailing edge shield of uniform thickness, with the pole and shield separated by a writer gap that is of uniform width and is characterized by a 90° angle between the back-end surface of the shield and the surface of the shield bounding the writer gap.

Referring first to FIG. 1, there is shown a highly schematic cross-sectional view of a pole and trailing edge shield (a shield formed adjacent to the trailing edge of the pole), taken through a plane orthogonal to the air bearing surface (ABS) plane. The trailing edge shield (10) is substantially of uniform thickness (from ABS to backside surface) as is the main pole (20). A writer (or write) gap (25), of uniform width separates the shield from the pole. The (encircled) angle (30) between the back-side face (15) and the shield edge (35) bordering the writer gap is 90°.

Figure 2:
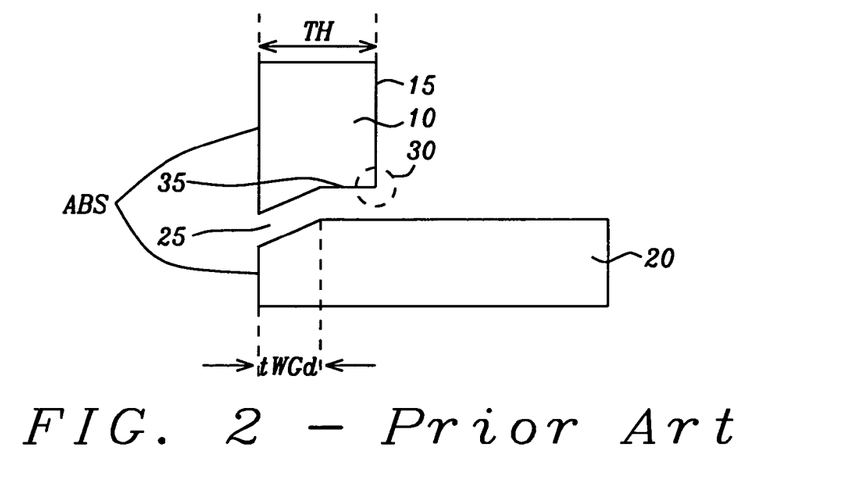
FIG. 2 is a schematic cross-sectional view, perpendicular to the ABS plane, of a prior art PMR writer having a main pole tip of tapering thickness adjacent to a prior art trailing edge shield of tapering thickness, with the pole and shield separated by a writer gap that is angled, but of uniform width and is characterized by a 90° angle between the back-end surface of the shield and the bounding surface of the shield and writer gap.

Referring next to FIG. 2, there is shown schematically a write head with a trailing edge shield (10) (or just "trailing shield") that is not of uniform thickness, a main pole (20) that is not of uniform thickness and a tapered (or angled) writer gap (25) formed between them. The writer gap is of uniform thickness (in a direction perpendicular to its surfaces) and will be characterized by a width denoted WG at the ABS end and a width denoted g at the back-side end. In this case, WG=g. The encircled angle (30) between the back-side face (15) and the back-side edge (35) bordering the writer gap is 90°.

Another feature of this configuration that will have an impact on the performance of the writer is the relationship between the throat height, denoted TH, of the trailing shield (indicated in the figure by arrows), which is the maximum thickness of the shield in the direction perpendicular to the ABS, and the length (in the direction perpendicular to the ABS) of the tapered portion of the main pole, denoted, tWGd (indicated by arrows). This relationship is important, because it determines the distance of least separation between the pole and the shield, which is a region in which the shield shunts flux from the pole.

Figure 3:
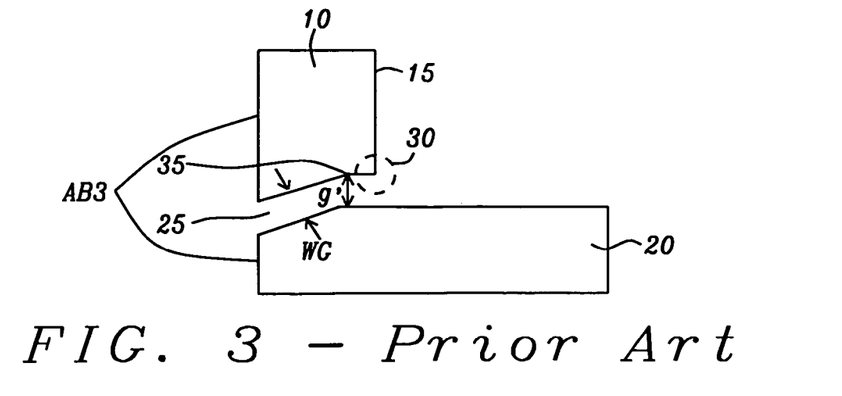
FIG. 3 is a schematic cross-sectional view, perpendicular to the ABS plane, of a prior art PMR writer having a main pole tip of tapering thickness adjacent to a prior art trailing edge shield of tapering thickness, with the pole and shield separated by a writer gap that is angled and not of uniform width and is characterized by a 90° angle between the back-end surface of the shield and the bounding surface of the shield and writer gap.

Referring next to schematic FIG. 3, there is shown a prior art head with a trailing shield (10) that is not of uniform thickness, a main pole (20) that is not of uniform thickness and a tapered writer gap (25) formed between them that is not of uniform width. The writer gap may be characterized by a width denoted WG at the ABS end and a width denoted g' (g-prime) at the back-side end. In this case, g'>WG. The encircled angle (30) between the back-side face (15) and the back-side edge (35) bordering the writer gap is 90°.

The prior art shows several writer configurations in which the ends of the shield are tapered. For example, Nishida et al., (U.S. Pat. No. 7,518,825) shows a writer with tapered shield ends.

Guan et al., assigned to the same assignee as the present invention, (US 2009/0207525) discloses a tapered main pole with the trailing shield having the same taper.

These prior art examples do not disclose methods by which controlling the taper of a shield can advantageously maintain the writing characteristics of a main pole while minimizing the amount of flux that is shunted away from it.

SUMMARY OF THE INVENTION

A first object of this invention is to design and fabricate a PMR writer with a pole and shield configuration that improves both the on-track and off-track performance of a PMR write head.

A second object of the present invention is design and fabricate a PMR writer with a pole and shield configuration that enhances the write field of the shielded pole.

A third object of the present invention is to satisfy the first two objects with a shield configuration that reduces flux shunting between the shields and the main pole.

These objects will be met by a shield design that replaces the sharp right angle corner between the leading edge surface of the trailing shield (that forms the write gap) and the back surface of the shield, by either a progression of two gradual corners formed of obtuse angles or by a single rounded corner. In either case, the single sharp 90° corner at which flux shunting mainly occurs is eliminated. In additional embodiments, the elimination of sharp angles at which flux shunting occurs is also be applied to the design of a leading edge shield, thereby further improving the write head performance. Finally, embodiments of the invention will include a design of the write gap between the trailing shield and the main pole that significantly reduces the distance of minimum separation between the shield and the tapered edge of the pole that borders the write gap.

BRIEF DESCRIPTION OF THE DRAWINGS

FIG. 5 is a graphical representation showing the improved down-track magnetic field performance of the invention illustrated in FIG. 4a.

FIG. 6b is a detailed view of the angular configuration of the trailing edge shield surface that bounds the write gap of the writer of FIG. 6a.

FIG. 9a is a schematic cross-sectional view, perpendicular to the ABS plane, of a fourth embodiment of a PMR writer that meets the objects of the present invention, in which a main pole tip of tapered thickness is adjacent to a leading edge shield of tapered thickness, with the pole and shield separated by a leading edge gap that is not of uniform width and is characterized by an obtuse angle between the back-end surface of the shield and the bounding surface of the leading edge gap.

FIG. 9b is a more detailed view of the angled corner between the back end surface and bounding surface of the gap of the leading edge shield of FIG. 9a.

DESCRIPTION OF THE PREFERRED EMBODIMENTS

The embodiments of the present invention include a main pole and shield formation that improves the performance of a PMR head by reducing flux shunting between the pole and shields. In each of the following five embodiments both the main pole and (trailing and leading) shields are formed from the magnetic materials FeNi, CoFe, CoNiFe, CoFeN or CoFePd. The main pole in each embodiment has a maximum thickness (thickness beyond its taper) of between 0.2 and 0.6 microns. In addition, although not explicitly illustrated, the PMR head can also include side shields in any of the embodiments and the leading and trailing shields can be combined. Particular attributes of the enumerated five embodiments can be summarized as follows:

1. A pole and leading edge shield formation in which the distance of minimal separation between the shield and the tapered edge of the pole along the write gap is minimized, thereby reducing the size of a region in which a great deal of flux is lost to the shield by the pole.
2. A pole and trailing edge shield formation in which the 90° angle between the back surface of the shield and the surface bounding the write gap is replaced by a succession of obtuse angles thereby eliminating the flux loss due to the concentration of flux at sharp edges.
3. A pole and trailing edge shield formation in which the 90° angle between the back surface of the shield and the surface bounding the write gap is replaced by a rounded corner, thereby eliminating the flux loss due to the concentration of flux at sharp edges.
4. A pole and leading edge shield formation in which the 90° angle between the back surface of the shield and the surface bounding the leading edge gap is replaced by a succession of obtuse angles thereby eliminating the flux loss due to the concentration of flux at sharp edges.
5. A pole and leading edge shield formation in which the 90° angle between the back surface of the shield and the surface bounding the leading edge gap is replaced by a rounded corner thereby eliminating the flux loss due to the concentration of flux at sharp edges.

First Embodiment

Figure 4A:
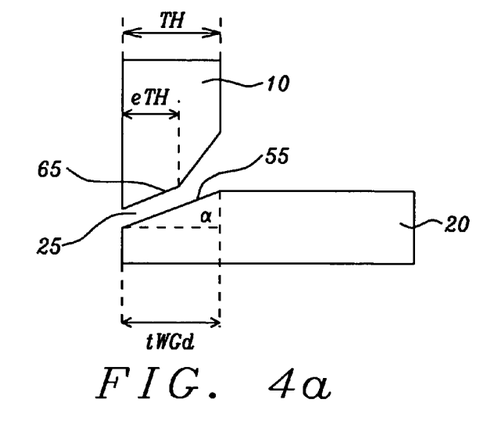
FIG. 4a is a schematic cross-sectional view, perpendicular to the ABS plane, of a first embodiment of the present invention, showing a PMR writer that meets the objects of the present invention. This embodiment has a main pole tip of tapered thickness adjacent to a trailing edge shield of tapered thickness, with the main pole and shield separated by an angled writer gap that is not of uniform width and is characterized by a shorter distance of minimum separation between the pole and shield along the portion of the writer gap bounded by the tapered surface of the pole.

Referring first to FIG. 4a, there is shown schematically, in a cross-sectional view taken in a plane perpendicular to the ABS plane (5) of a main pole, a first preferred embodiment of the invention which is a PMR write head with a trailing shield (10) that is not of uniform thickness but has a maximum thickness, denoted TH (throat height). The main pole (20) has a maximum thickness, beyond a tapered portion (55), of between approximately 0.2 microns and 0.6 microns. The main pole is substantially of uniform thickness beyond this tapered portion. The tapered portion (55) is characterized by an angle with the horizontal (i.e., the horizontal being hereinafter defined as the direction perpendicular to the ABS plane), here denoted a. The upwardly tapered portion extends horizontally away from the ABS of the pole (5) for a horizontal distance denoted tWGd, which is between approximately 30 nm and 400 nm. The pole and shield are preferably formed of the magnetic materials FeNi, CoFe, CoNiFe, CoFeN or CoFePd.

The region of the shield (10) that is immediately adjacent to the tapered portion of the pole has a double taper. The first part of the taper (65), which extends horizontally back from the ABS for a distance denoted eTH, is characterized by an angle β with the horizontal, which is substantially the same as the angle α that characterizes the taper of the pole. This angle is shown more clearly in FIG. 4b. Therefore the region of the writer gap (25) extending rearward from the ABS is substantially of uniform thickness of between about 15 and 50 nm, where it is bounded by the first part of the taper (65) because β and α are, typically, substantially equal. The writer gap in this region of uniform width is filled by a material layer formed of any of a group of non-magnetic dielectric or metal materials, such as the dielectrics $Al_2O_3$, $SiO_2$, $TiO_2$, or the metals Ru, Ta, NiCr, or NiNb.

Figure 4B:
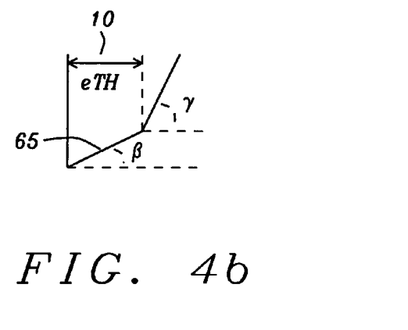
FIG. 4b is a detailed view of the angular configuration of the trailing edge shield surface that bounds the write gap.

Beyond region (65), the shield acquires a second part of its taper, which is characterized by an angle γ, that is always greater than β. This creates a second portion of the writer gap that is not of uniform width, but flares away from the trailing side of the pole. We shall see below, when describing a fabrication method for the shield, that this non-uniform region of the writer gap may be filled by a combination of non-magnetic materials.

Referring to schematic FIG. 4b, there is shown more clearly the double taper of the shield that is characterized by the two angles β and γ and by the thickness eTH, horizontally away from the ABS that characterizes the first tapered portion. The angles β (of the shield) and α (of the pole) can be in the range between approximately 5° and 45° (with 5° being preferred) whereas γ is in the range between approximately 30° and 80° with 60° being preferred.

The portion of the shield (65) characterized by the first angle β creates a small region of the write gap ((25) in FIG. 4a) that is essentially of uniform thickness. This region extends horizontally rearward from the ABS for a distance denoted eTH, which is smaller than or equal to TH, the maximum shield thickness. The combination of the doubly tapered shield and the size of eTH as compared to TH, reduces the amount of flux shunting from the main pole to the shield within the region of the write gap (25) where the shield and pole are closely adjacent.

Figure 4C:
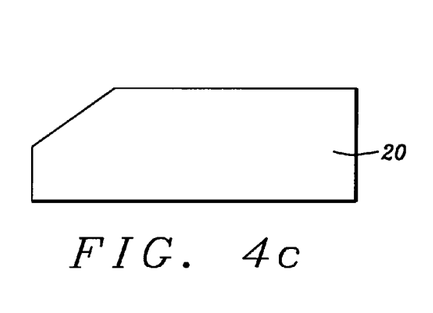
FIG. 4c-FIG. 4f is a schematic sequence of process steps by which the shaped trailing edge shield of FIG. 4a may be formed.

Referring to FIGS. 4c-4f there is shown a schematic sequence of process steps by which the double tapered shield of FIGS. 4a and 4b may be advantageously formed. Referring first to FIG. 4c, there is shown a vertical cross-sectional view of the main pole (20), which has been formed previously to the shield.

Figure 4D:
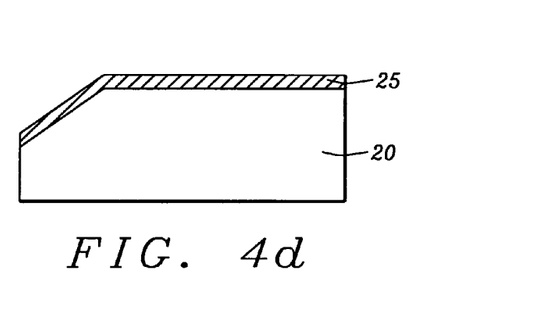

Referring next to schematic FIG. 4d, there is shown the main pole (20) of FIG. 4c on which a write gap layer (25) has now been deposited. The write gap layer is deposited to a uniform thickness of between approximately 15 and 50 nm and is formed of any of a group of non-magnetic dielectric or metal materials, such as the dielectrics $Al_2O_3$, $SiO_2$, $TiO_2$, or the metals Ru, Ta, NiCr, or NiNb.

Figure 4E:
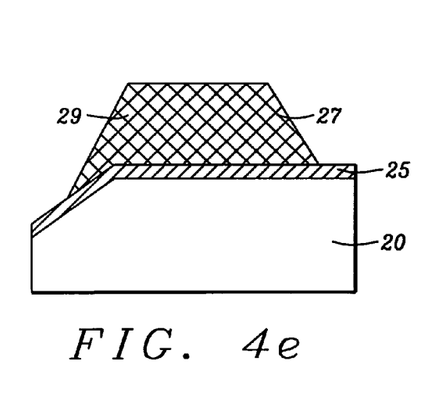

Referring next to schematic FIG. 4e, there is shown the fabrication of FIG. 4d on which an additional non-magnetic spacer layer (27) has now been deposited. This layer is typically formed of dielectric materials and is shaped so that its front sloping surface (29) is at an angle to provide the angle γ with the horizontal shown in FIG. 4b. Note also that the angle of the tapered main pole, α, and the angle of the trailing edge shield where it contacts the writer gap layer, β, are shown as being the same, producing a writer gap of uniform thickness. The equality of these two angles need not be exact, however.

The deposition and shaping of the spacer layer may be provided by any of several methods known in the art, such as by use of a lift-off mask.

Figure 4F:
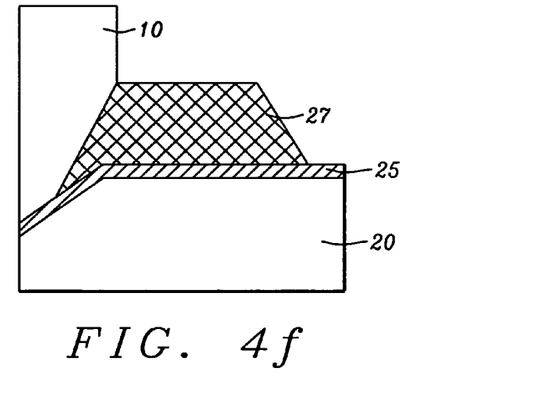

Referring next to schematic FIG. 4f, there is shown the trailing shield (10) plated conformally against the spacer layer to complete the fabrication shown in FIG. 4a. It will be understood by those skilled in the art that by appropriate shaping of the spacing layer (27), advantageous edge shapes of the trailing shield (10) will be obtained. It is also seen that the uniformly thick portion of the writer gap region is filled with the single non-magnetic material specified above, by the tapered portion of the writer gap region behind the uniform region may be filled with different materials, depending on the materials chosen for the spacer layer (27).

Figure 5:
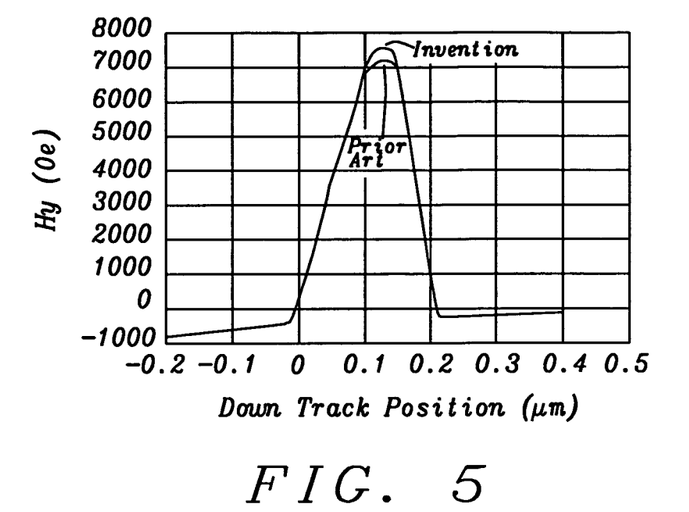

Referring next to FIG. 5, there is shown graphical verification of the improvement of the invention over the prior art. The graph demonstrates that downtrack (in microns) performance of the invention (dotted line) provides an improved write field ($H_y$ (Oe)) when compared to a prior art PMR writer (solid line). This particular graphical result corresponds to β=α=32°, eTH=100 nm, tWGd=300 nm and TH=250 nm. The prior art configuration has the same main pole, but a non-tapered shield.

Second Embodiment

Figure 6A:
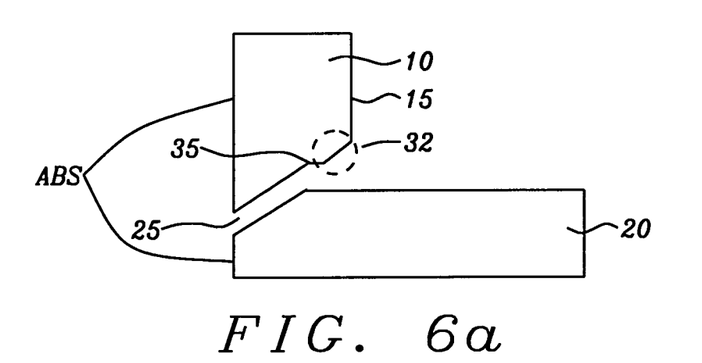
FIG. 6a is a schematic cross-sectional view, perpendicular to the ABS plane, of a second embodiment of a PMR writer that meets the objects of the present invention having a main pole tip of tapered thickness adjacent to a prior art trailing edge shield of tapered thickness, with the pole and shield separated by an angled writer gap that is not of uniform width and is characterized by a succession of obtuse angles between the back-end surface of the shield and the bounding surface of the shield and writer gap.

Referring first to FIG. 6a, there is shown schematically a second preferred embodiment of the invention in which a trailing shield (10) and a tapered main pole (20) are separated by a write gap (25) that is angled and not of uniform width. The backside edge (15) of the shield no longer forms a 90° angle with the leading edge of the shield (35) whose surface forms the write gap (25). Instead, a circled succession of two obtuse angles (32) creates a gradual corner without the sharp point of a 90° angle that became a source of flux leakage.

Figure 6B:
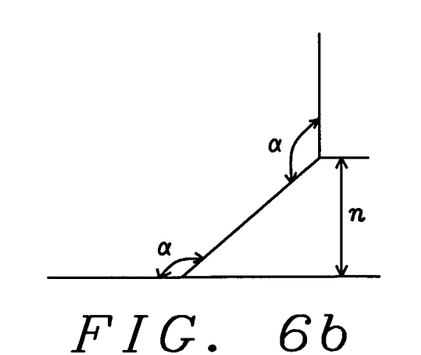

Referring to FIG. 6b, there is shown an enlarged view of the two obtuse angles (each being an angle α) encircled in (32) in FIG. 4a. The angles α and the height h which separates their vertices vertically (i.e. in a direction perpendicular to leading edge surface of the pole) are the parameters of the new shape. Their values range as follows: α in the range between approximately 120° and 170°, but preferably within the smaller range of between 135° and 165°, while h is in the range between approximately 0.05 and 0.3 microns. This design can be used to replace a 90° angle at any shield corner where it is desired to eliminate or reduce flux leakage.

Figure 7:
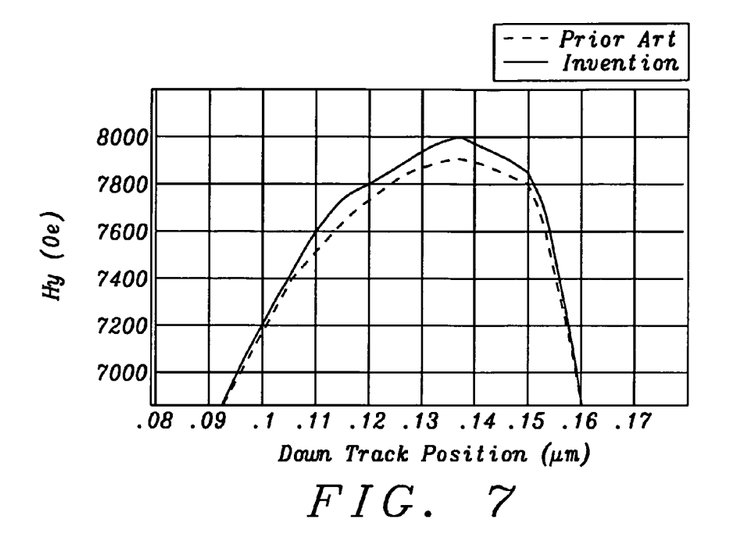
FIG. 7 is a graphical representation of the improvement in down-track field performance of the invention compared with the prior art.

Referring to FIG. 7, there is shown a graphical representation of a down-track field profile comparison between this embodiment of the present invention and a shielded PMR head of the prior art. As can be seen, the solid line representing the invention shows a consistently stronger field, $H_y$, indicating that less flux is lost to the shield.

Third Embodiment

Figure 8:
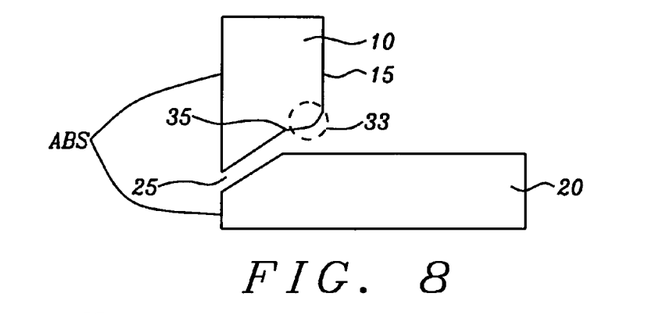
FIG. 8 is a schematic cross-sectional view, perpendicular to the ABS plane, of a third embodiment of the present invention, showing a PMR writer that meets the objects of the present invention having a main pole tip of tapered thickness adjacent to a prior art trailing edge shield of tapered thickness, with the pole and shield separated by an angled writer gap that is not of uniform width and is characterized by a rounded corner between the back-end surface of the shield and the bounding surface of the shield and writer gap.

Referring to schematic FIG. 8, there is shown a configuration of a trailing shield (10) and a tapered main pole (20). In this embodiment, the (encircled) corner (33) formed between the backside surface (15) of the shield and the leading edge surface (35) bordering the rear of the write gap is formed as a rounded surface rather than a succession of obtuse angles as shown in FIG. 6a. The rounded corner, which would have a radius of curvature of between approximately 50 to 300 nm, achieves a similar result in that it eliminates sharp corners that are the source of flux leakage.

Fourth Embodiment

Figures 9A, 9B:
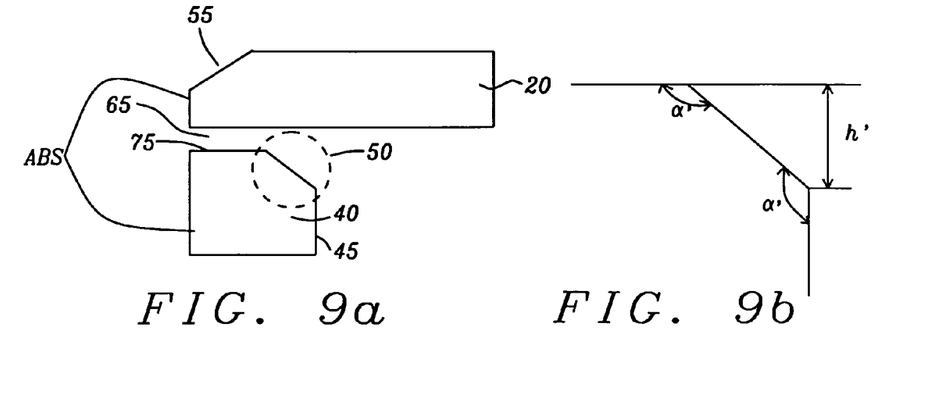

Referring to schematic FIG. 9a, there is shown a configuration of a tapered main pole (20) of a PMR writer that is shielded by a leading edge shield (40). Note that the tapered edge (55) is now above the shield (40). Although the main pole would most likely also have a trailing edge shield (possibly as well as side shields) as shown in the previous embodiments, this embodiment is directed at eliminating flux leakage from sharp corners on a leading edge shield so additional shields are not shown. To that end, the circled (50) area at the back surface of the shield shows that the typical prior art 90° between the backside surface (45) of the shield and the trailing edge surface of the shield (75) that borders the leading edge gap (65) is now replaced by a more gradual corner formed by a succession of two obtuse angles just as, in the previous embodiment, was applied to the trailing edge shield.

Referring to FIG. 9b, there is shown an enlarged view of the two obtuse angles (each being denoted angle α') encircled in (50) in FIG. 9a. The vertices of the angles α' are separated by a vertical (perpendicular to the leading edge surface of the pole) height h'. These parameters of the new shape, range in value as follows: α in the range between approximately 120° and 170°, but preferably within the smaller range of between 135° and 165°, while h' is in the range between approximately 0.05 and 0.3 microns. As noted above, this design can be used to replace a 90° angle at any shield corner where it is desired to eliminate or reduce flux leakage.

Figure 9C:
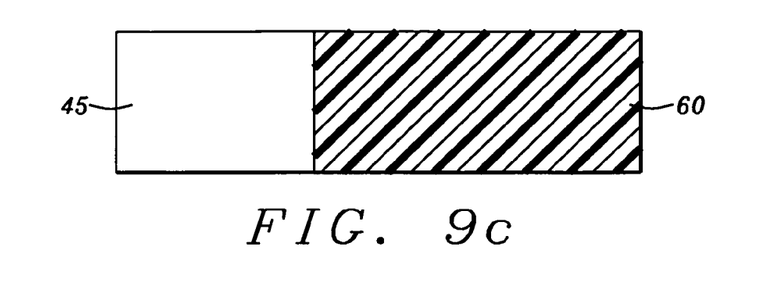
FIG. 9c-FIG. 9e is a sequence of schematic process steps by which the shaped leading edge shield may be formed.
Figure 9D:
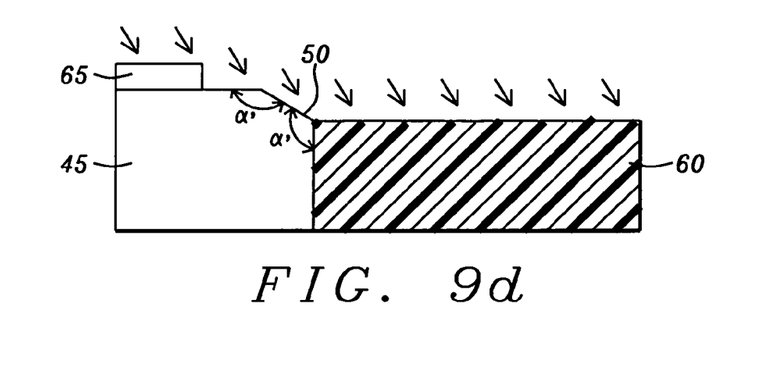
Figure 9E:
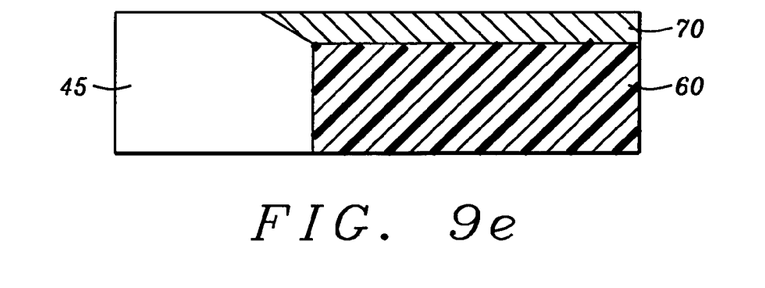

Referring now to FIGS. 9c-9e, there is shown a schematic sequence of process steps by which the shaped leading shield of FIG. 9a is finally formed.

Referring first to FIG. 9c, there is shown a leading shield layer (45) that has been deposited as a rectangular parallelepiped and is as yet unshaped in accord with the method of this invention. A layer of non-magnetic dielectric material (60) is formed behind the shield. A vertical dashed line shows the eventual position of the ABS plane.

Referring to FIG. 9d, there is shown the fabrication of FIG. 9c, further including a protective dielectric layer (65) formed over the shield layer. An ion beam etch (arrows) forms a downward sloping region (50) of the shield layer and, at the same time, reduces the thickness of dielectric layer (60). The protective layer (65) has allowed the ion beam etch to create the downward sloping region without adversely impacting the front region of the shield. Moreover, the tapered surface intersects the back surface a vertical distance h' below the upper surface of the shield layer and there is now a corner formed by two successive obtuse angles α' having vertices separated by a vertical distance h'. The vertical dashed line is the eventual position of the ABS plane.

Referring to FIG. 9e, there is shown the fabrication of FIG. 9d with the addition of a dielectric re-fill layer (70), which has been planarized to produce a level surface over which a leading gap layer will be deposited and the main pole will be formed as shown in FIG. 9a. Additional shields may now also be formed.

Fifth Embodiment

Figure 10:
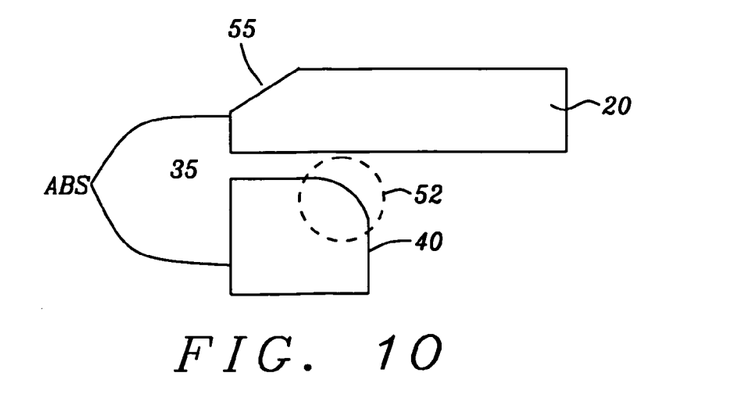
FIG. 10 is a schematic cross-sectional view, perpendicular to the ABS plane, of a fifth embodiment of a PMR writer that meets the objects of the present invention, in which a main pole tip of tapered thickness is adjacent to a leading edge shield of tapered thickness, with the pole and shield separated by a leading edge gap that is not of uniform width and is characterized by an rounded corner between the back-end surface of the shield and the bounding surface of the leading edge gap.

Referring to schematic FIG. 10, there is shown a configuration of a leading edge shield (40) and a tapered main pole (20) which is in all respects similar to the configuration in the fourth embodiment except that in this embodiment, the (encircled) corner (52) formed between the backside edge of the shield and the edge (35) bordering the rear of the write gap is a rounded surface rather than a succession of obtuse angles as shown in FIG. 9a. The rounded corner, which preferably has a radius of curvature between approximately 50 and 300 nm achieves a similar result in that it eliminates sharp corners that are the source of flux leakage.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a main pole and trailing edge shield and/or leading edge shield with reduced flux shunting between the pole and shield, while still forming and providing such a PMR head and its method of formation in accord with the spirit and scope of the present invention as defined by the appended claims.

What is claimed is:

1. PMR head comprising:
    a main pole having a first portion of a trailing edge surface upwardly tapered at an angle α relative to a perpendicular to an ABS and extending away from said ABS for a perpendicular distance tWGd and a second portion having no taper and a uniform width thereafter;
    a trailing edge shield having an ABS, a back surface parallel to said ABS and separated from said ABS by a distance TH and a doubly angled leading edge surface joining said ABS and said back surface, wherein a first portion of said leading edge surface is a plane that contacts said ABS and makes an angle β with a perpendicular to said ABS and extends a perpendicular distance eTH from said ABS and wherein a second portion of said of said leading edge surface is a plane that joins said first portion to said back surface and makes an angle γ with a perpendicular to said ABS; wherein
    the separation between said first portion of said main pole and said first portion of said leading edge surface of said trailing edge shield forms a writer gap portion of substantially uniform width and wherein a separation between said main pole and said second portion of said leading edge surface of said trailing edge shield increases with distance perpendicularly away from said ABS.

2. The PMR head of claim 1 wherein said pole and shield are preferably formed of the magnetic materials FeNi, CoFe, CoNiFe, CoFeN or CoFePd and wherein said writer gap is filled any of the non-magnetic dielectric materials $Al_2O_3$, $SiO_2$, $TiO_2$, or the metals Ru, Ta, NiCr, or NiNb.

3. The PMR head of claim 1 wherein the angle α is between approximately 5° and 45°.

4. The PMR head of claim 1 wherein the angle β is between approximately 5° and 45°.

5. The PMR head of claim 1 wherein the angle γ is larger than angle β and is between approximately 30° and 80°.

6. The PMR head of claim 1 wherein eTH is smaller than or equal to TH.

7. The PMR head of claim 1 wherein tWGd is between approximately 30 nm and 400 nm.

8. The PMR head of claim 1 wherein said main pole has a thickness between approximately 0.2 microns and 0.6 microns.

9. The PMR head of claim 1 also including a leading edge shield and side shields.

10. A PMR head comprising:
a main pole having a tapered portion on a trailing edge side in a direction away from an ABS and an untapered portion having a uniform width thereafter;
a trailing edge shield having an ABS, a back surface parallel to said ABS and a leading edge surface joining said ABS and said back surface, wherein a separation between said leading edge surface and said tapered portion of said main pole forms a writer gap; wherein
said leading edge surface joins said back surface at a tapered corner formed by two successive obtuse angles α having vertices separated vertically by a distance h;
whereby a single 90° corner between said leading edge surface and said back surface is, thereby, eliminated and wherein a separation between said main pole and said tapered corner increases with a distance perpendicularly away from said ABS.

11. The PMR head of claim 10 wherein said angles α range in value between approximately 120° and 170° and said height h ranges in value between approximately 0.05 and 0.3 microns.

12. The PMR head of claim 10 wherein said pole and shield are preferably formed of the magnetic materials FeNi, CoFe, CoNiFe, CoFeN or CoFePd and wherein said writer gap is filled any of the non-magnetic dielectric materials $Al_2O_3$, $SiO_2$, $TiO_2$, or the metals Ru, Ta, NiCr, or NiNb.

13. The PMR head of claim 10 wherein said main pole has a thickness between approximately 0.2 microns and 0.6 microns.

14. The PMR head of claim 10 also including a leading edge shield and side shields.

15. A PMR head comprising:
a main pole having a tapered portion on a trailing edge side in a direction away from an ABS and having a uniform width thereafter;
a trailing edge shield having an ABS, a back surface parallel to said ABS and a leading edge surface joining said ABS and said back surface, wherein a separation between said leading edge surface and said tapered portion of said main pole forms a write gap; wherein
said leading edge surface joins said back surface at a rounded corner;
whereby a single 90° corner between said leading edge surface and said back surface is eliminated and wherein the separation between said leading edge surface of said trailing edge shield increases at said rounded corner with a distance perpendicularly away from said ABS.

16. The PMR head of claim 15 wherein said pole and shield are preferably formed of the magnetic materials FeNi, CoFe, CoNiFe, CoFeN or CoFePd and wherein said writer gap is filled any of the non-magnetic dielectric materials $Al_2O_3$, $SiO_2$, $TiO_2$, or the metals Ru, Ta, NiCr, or NiNb.

17. The PMR head of claim 15 wherein said main pole has a thickness between approximately 0.2 microns and 0.6 microns.

18. The PMR head of claim 15 also including a leading edge shield and side shields.

19. The PMR head of claim 15 wherein said rounded corner has a radius of curvature of between approximately 50 and 300 nm.

20. A PMR head comprising:
a main pole tapered on a trailing edge side for a distance tWGd in a direction away from an ABS and having a uniform width thereafter;
a leading edge shield having an ABS, a back surface parallel to said ABS and a trailing edge surface joining said ABS and said back surface, wherein a separation between said trailing edge surface and said main pole forms a leading edge gap; wherein
said trailing edge surface joins said back surface at a tapered corner formed by two successive obtuse angles α' having vertices separated by a vertical distance h';
whereby a single 90° corner between said leading edge surface and said back surface of said leading edge shield is eliminated and wherein a separation between said main pole and said tapered corner of said trailing edge surface of said leading edge shield increases with a distance perpendicularly away from said ABS.

21. The PMR head of claim 20 wherein said angles α' range in value between approximately 120° and 170° and said height h' ranges in value between approximately 0.05 and 0.3 microns.

22. The PMR head of claim 20 wherein said pole and shield are preferably formed of the magnetic materials FeNi, CoFe, CoNiFe, CoFeN or CoFePd and wherein said leading edge gap is filled any of the non-magnetic dielectric materials $Al_2O_3$, $SiO_2$, $TiO_2$, or the metals Ru, Ta, NiCr, or NiNb.

23. The PMR head of claim 20 wherein said main pole has a thickness between approximately 0.2 microns and 0.6 microns.

24. The PMR head of claim 20 also including a trailing edge shield and side shields.

25. A PMR head comprising:
a main pole tapered for a distance tWGd on a trailing edge side in a direction away from an ABS and having a uniform width thereafter;
a leading edge shield having an ABS, a back surface parallel to said ABS and a trailing edge surface joining said ABS and said back surface, wherein a separation between said trailing edge surface and said main pole forms a leading edge gap; wherein
said trailing edge surface joins said back surface at a rounded corner;
whereby a single 90° corner between said leading edge surface and said back surface of said leading edge shield is eliminated and wherein a separation between said main pole and said rounded corner of said trailing edge surface of said leading edge shield increases with a distance perpendicularly away from said ABS.

26. The PMR head of claim 25 wherein said pole and shield are preferably formed of the magnetic materials FeNi, CoFe, CoNiFe, CoFeN or CoFePd and wherein said leading edge gap is filled any of the non-magnetic dielectric materials $Al_2O_3$, $SiO_2$, $TiO_2$, or the metals Ru, Ta, NiCr, or NiNb.

27. The PMR head of claim 25 wherein said main pole has a thickness between approximately 0.2 microns and 0.6 microns.

28. The PMR head of claim 25 wherein said rounded corner has a radius of curvature of between approximately 50 and 300 nm.

29. The PMR head of claim 25 also including a trailing edge shield and side shields.

* * * * *